(12) United States Patent
Metzler et al.

(10) Patent No.: US 9,658,059 B2
(45) Date of Patent: May 23, 2017

(54) MEASURING DEVICE HAVING A SCANNING FUNCTIONALITY AND A SINGLE-POINT MEASUREMENT MODE

(71) Applicant: HEXAGON TECHNOLOGY CENTER GMBH, Heerbrugg (CH)

(72) Inventors: Bernhard Metzler, Dornbirn (AT); Jürg Hinderling, Marbach (CH); Thomas Jensen, Rorschach (CH)

(73) Assignee: HEXAGON TECHNOLOGY CENTER GMBH, Heerbrugg (CH)

(*) Notice: Subject to any disclaimer, the term of this patent is extended or adjusted under 35 U.S.C. 154(b) by 407 days.

(21) Appl. No.: 14/375,421

(22) PCT Filed: Jan. 30, 2013

(86) PCT No.: PCT/EP2013/051805
§ 371 (c)(1),
(2) Date: Jul. 29, 2014

(87) PCT Pub. No.: WO2013/113758
PCT Pub. Date: Aug. 8, 2013

(65) Prior Publication Data
US 2015/0029489 A1    Jan. 29, 2015

(30) Foreign Application Priority Data
Jan. 30, 2012  (EP) ................................. 12153163

(51) Int. Cl.
*G01C 3/08*     (2006.01)
*G01B 11/14*    (2006.01)
(Continued)

(52) U.S. Cl.
CPC .............. *G01B 11/14* (2013.01); *G01B 11/26* (2013.01); *G01C 15/002* (2013.01); *G01S 7/4812* (2013.01); *G01S 7/4817* (2013.01)

(58) Field of Classification Search
CPC ... G01C 15/002; G01S 7/4812; G01S 7/4815; G01B 11/26; G01B 11/14
(Continued)

(56) References Cited

U.S. PATENT DOCUMENTS 5,886,340 A    3/1999 Suzuki et al.
6,072,642 A    6/2000 Shirai
(Continued)

FOREIGN PATENT DOCUMENTS

CN    101416024 A    4/2009
CN    102232173 A    11/2011
(Continued)

OTHER PUBLICATIONS

European Search Report dated Jun. 11, 2012 as received in Application No. EP 12 15 3163.

*Primary Examiner* — Mark Hellner
(74) *Attorney, Agent, or Firm* — Maschoff Brennan

(57) ABSTRACT

Embodiments described herein relate to a measuring device, comprising a base that defines a vertical axis, an assembly that can be pivoted about the vertical axis relative to the base, and a beam deflecting unit for varying the orientation of a measurement axis, wherein the beam deflecting unit can be rotated about a horizontal axis relative to the assembly. The measuring device further has a distance measurement functionality for measuring distance by means of the measurement radiation, an angle measurement functionality for determining an orientation of the measurement axis relative to the base, a control and processing unit for processing data and for controlling the measuring device, and a scanning functionality, wherein when the scanning functionality is executed, a scan is performed, and a point cloud comprising
(Continued)

the scan points is produced. The assembly also has an imaging system. The measuring device may have a single-point measurement mode.

17 Claims, 6 Drawing Sheets

(51) Int. Cl.
  *G01C 15/00* (2006.01)
  *G01S 7/481* (2006.01)
  *G01B 11/26* (2006.01)

(58) Field of Classification Search
  USPC .......................................... 356/4.01
  See application file for complete search history.

(56) References Cited

U.S. PATENT DOCUMENTS

| | | | |
|---|---|---|---|
| 6,433,858 B1 | 8/2002 | Suzuki | |
| 7,342,650 B2 | 3/2008 | Kern et al. | |
| 7,869,005 B2* | 1/2011 | Ossig | G01C 15/002 |
| | | | 356/3.01 |
| 8,294,769 B2 | 10/2012 | Otani et al. | |
| 9,074,883 B2 | 7/2015 | Schumann et al. | |
| 2005/0099637 A1* | 5/2005 | Kacyra | G01B 11/002 |
| | | | 356/601 |
| 2008/0075326 A1* | 3/2008 | Otani | G01C 3/00 |
| | | | 382/106 |
| 2010/1304596 | 6/2010 | Becker | |
| 2012/0069352 A1 | 3/2012 | Ossig et al. | |
| 2013/0054187 A1* | 2/2013 | Pochiraju | G01C 3/08 |
| | | | 702/150 |

FOREIGN PATENT DOCUMENTS

| | | |
|---|---|---|
| CN | 102232174 A | 11/2011 |
| DE | 197 10 722 A1 | 10/1997 |
| DE | 199 267 06 A1 | 12/1999 |
| DE | 199 495 80 A1 | 4/2000 |
| DE | 10 2008 014 275 A1 | 8/2009 |
| EP | 2 141 450 A1 | 1/2010 |
| EP | 2 219 011 A1 | 8/2010 |
| WO | 97/40342 A2 | 10/1997 |
| WO | 03/062744 A1 | 7/2003 |
| WO | 2004/036145 A1 | 4/2004 |
| WO | 2006/000552 A1 | 1/2006 |

* cited by examiner

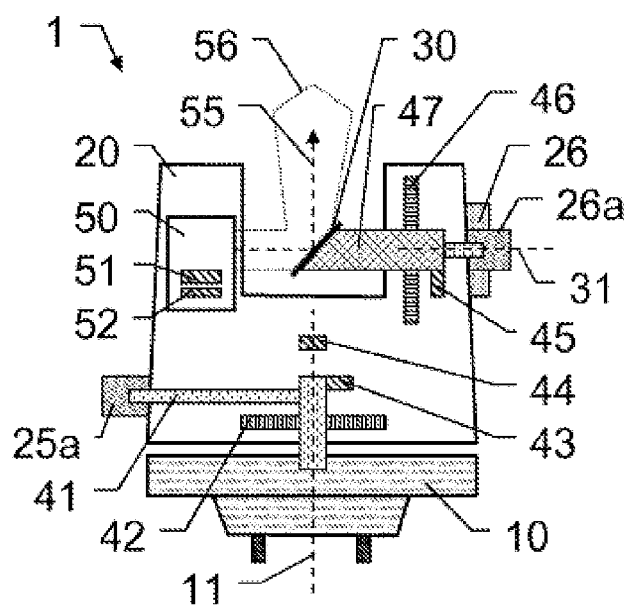
Fig.3
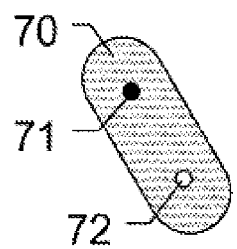  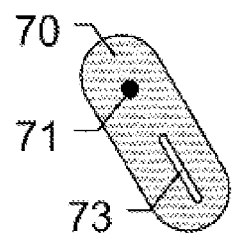
Fig.4a          Fig.4b

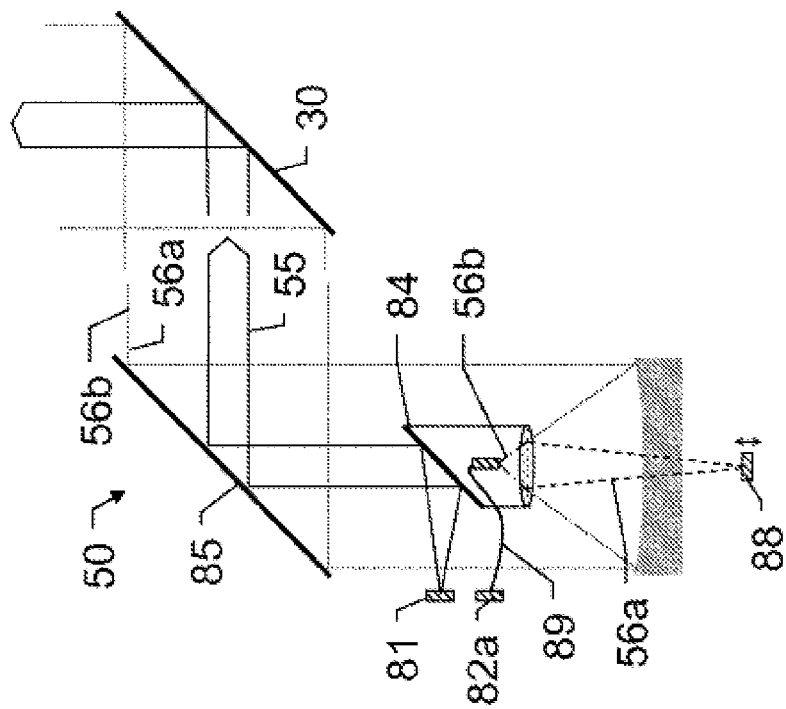
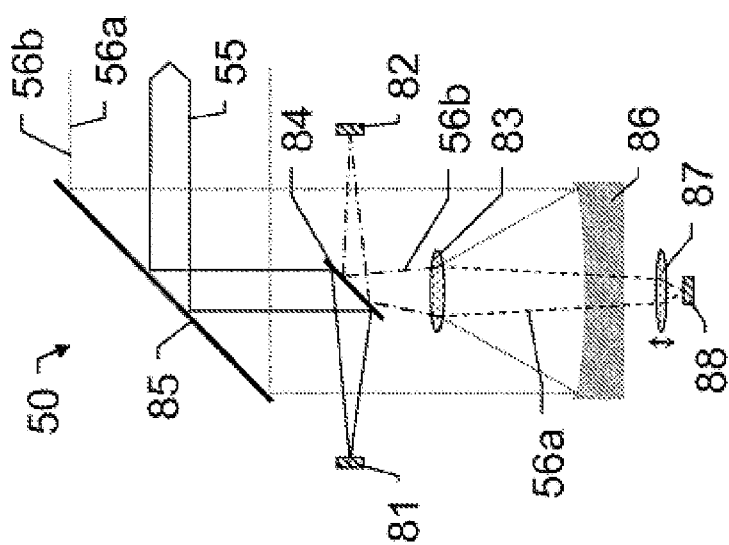

MEASURING DEVICE HAVING A SCANNING FUNCTIONALITY AND A SINGLE-POINT MEASUREMENT MODE

FIELD OF THE INVENTION

The invention relates to a surveying instrument comprising a radiation source for generating measurement radiation and a deflection unit for aligning the measurement radiation relative to a base, according to the preamble of claim 1.

BACKGROUND

In order to acquire objects or surfaces, use is often made of methods which successively scan and, in the process, record the topography of a structure such as e.g. a building. Here, such a topography constitutes a related sequence of points, which describes the surface of the object, or else a corresponding model or description of the surface. A conventional approach lies in carrying out a scan by means of a laser scanner which in each case acquires the spatial position of a surface point by virtue of the distance to the targeted surface point being measured and this measurement being linked to the angle information relating to the laser emission. From this distance and angle information, the spatial position of the respectively acquired point can be determined and the surface can be measured continuously. In many cases, an image is also recorded by means of a camera in parallel with this purely geometric acquisition of the surface, which camera also provides further information, for example in respect of the surface texture, in addition to the visual overall view.

Thus, for example, WO 97/40342 describes a method which records a topography by scanner systems set up in a stationary manner. A fixed set up point is selected for these systems, which set up point serves as a base for a scanning process brought about by motors. The three-dimensional spatial information of the respective surface point can be derived from the distance to the measured point, the angle position at the time of the measurement and the known location of the scanning device. Here, the scanner systems are designed specifically for the object of acquiring the topography and scan a surface by moving the scanner system or by modifying the beam path.

Other methods use mobile systems, which scan a structure to be acquired by a movement of the scanner system, or which support or complement the scan. Such systems are particularly suitable for acquiring linear or linearly drivable structures such as e.g. track installations, roads, tunnel systems or airfields.

Such acquisition processes known from the prior art provide images or topographic data which essentially represent the information about the spatial distribution or arrangement relationship of surface points. Optionally, additionally recorded images enable the derivation of further information. As a result, the structure and the profile of the surface can be reconstructed comparatively well. However, the lack of qualitative specifications about the type and composition of the surface, in particular in view of the inner structure or composition, is disadvantageous. Thus, images recorded parallel to the scanning usually enable the identification of different brightness values. Furthermore, EP 1 759 172 describes a scanner system and a method for acquiring surfaces in a spectrally resolved manner, which provides a derivation of surface properties from the information obtained thereby.

Such laser scanners according to the prior art enable a user to acquire large surfaces and objects completely, and optionally with additional object information, while expending relatively little time—depending on a desired point-to-point resolution. Here, laser scanners are typically configured in such a way that primarily point clouds with a large number of measurement points can be acquired and this acquisition is brought about with a sufficient accuracy. Since laser scanners do not have a targeting apparatus for highly precise targeting of a target, this accuracy of the point coordinates derivable in the process does not meet the high geodetic accuracy standards, as have been established for e.g. modern surveying instruments, in particular for total stations or theodolites.

In general, modern total stations have a compact and integrated design, wherein coaxial distance measurement elements and computer, control and memory units are usually available in an instrument. Depending on the configuration level of the total station, a motorization of the targeting or sighting apparatus and—in the case where retroreflectors (for example an all-round prism) are used as target objects—means for automated target search and tracking can moreover be integrated. As a human-machine interface, the total station can comprise an electronic viewer/control unit—generally a microprocessor computer with electronic data storage means—with a display and input means, e.g. a keyboard. The measured data acquired by electro-sensory means are fed to the viewer/control unit such that the position of the target point can be established, optically displayed and stored by the viewer/control unit. Total stations known from the prior art can furthermore comprise a radio data interface for establishing a radio link to external peripheral components such as e.g. a portable data acquisition instrument which, in particular, can be embodied as a data logger or field computer.

For sighting or targeting the target point to be measured, generic geodetic surveying instruments have a telescopic sight, such as e.g. an optical telescope, as a sighting apparatus. In general, the telescopic sight can be rotated about a vertical axis and about a horizontal tilt axis relative to a base of the surveying instrument such that the telescope can be aligned on the point to be measured by pivoting and tilting. In addition to the optical viewing channel, modern instruments can comprise a camera, which is integrated into the telescopic sight and, for example, aligned coaxially or in parallel, for acquiring an image, wherein the acquired image can, in particular, be depicted as a live image on the display of the viewer/control unit and/or on a display of the peripheral instrument—such as the data logger—used for remote control. Here, the optical unit of the sighting apparatus can comprise a manual focus—for example a set screw for changing the position of a focusing optical unit—or have an autofocus, wherein the focus position is changed by e.g. servomotors. By way of example, such a sighting apparatus of a geodetic surveying instrument is described in EP 2 219 011. Automatic focusing apparatuses for telescopic sights of geodetic instruments are known from e.g. DE 197 107 22, DE 199 267 06 or DE 199 495 80.

Since target objects (e.g. the plumb rods with target marker, such as an all-round prism, which are usually used for geodetic purposes) cannot be targeted sufficiently precisely with the naked eye on the basis of the sighting apparatus despite the 30-fold optical magnification often provided, conventional surveying instruments in the meantime have as standard an automatic target tracking function for prisms serving as target reflector (ATR: "Automatic Target Recognition"). For this, a further separate ATR light source—e.g. a multimode fiber output, which emits optical radiation having a wavelength in the range of 850 nm—and a specific ATR detector (e.g. CMOS area sensor) sensitive to said wavelength are conventionally additionally integrated in the telescope. By way of example, EP 2 141 450 describes a surveying instrument with a function for automatic targeting of a retroreflecting target and with automatic target tracking functionality.

Additionally, scanning functions can be integrated into total stations or theodolites as additional functions. By way of example, WO 2004/036145 has disclosed a geodetic measurement instrument which emits a laser beam for measuring the distance from the position thereof from within the acquired region. Such measurement instruments can likewise be modified for the scanning acquisition of surfaces or operated without modification. Motorized theodolites or total stations constitute an example for this.

Using such modern surveying instruments, the coordinates of target points to be measured can be determined with a very high geodetic precision. To this end, the laser beam must initially be aligned very accurately on the target, and the distance to the target and alignment of the laser beam have to be determined in this targeting state. Subsequently, it is possible to derive a position of the target (at least relative to the surveying instrument). However, a disadvantage here is that a large-area topographic object survey using e.g. a total station therefore means a disproportionately high expenditure of time—compared to a measurement process of the laser scanner on the object—in particular as a result of the mass of the telescope to be aligned.

Depending on a surveying object addressed, a surveyor can therefore require either a laser scanner or a total station/theodolite for working on the object. Moreover, for example, it may be necessary within the same survey to scan a surface and precisely determine a point of a single target point situated on the surface or a different object. In general, two differently designed instruments, namely a laser scanner for scanning surfaces and a total station for an accurate geodetic determination of a target point position, therefore have to be available. This constitutes a great disadvantage, in view of the number of instruments and peripheral components to be carried around or kept available, in view of the acquisition costs connected therewith and in view of the learning outlay for proper operation of both instruments.

SUMMARY

Some embodiments provide for an improved surveying instrument, which enables a user to work on different surveying objects more easily.

Some embodiments provide for an improved piece of surveying equipment which, in addition to a highly precise target point determination option, enables a functionality for fast acquisition of a multiplicity of target points with—in relation to a multiple precise target point determination—little expenditure of time.

Some embodiments provide for an improved surveying instrument, which is embodied both for fast recording of points by means of grid-like object scanning and for precisely staking out coordinates, i.e. for transmitting coordinates into terrain.

Some embodiments provide for an improved surveying instrument which unifies in itself the advantages of a laser scanner—in particular for fast scanning of an object—and the advantages of a total station or of a theodolite—in particular highly precisely determining the position of a target point and/or highly precisely determining the angle or determining the distance between two points—and thereby overcomes the aforementioned disadvantages.

The invention describes a surveying instrument which unifies in itself the functionality of a total station and of a laser scanner. This enables, on the one hand, accurate targeting and recording or staking out of single points and, on the other hand, efficient acquisition of large point clouds.

The invention relates to a surveying instrument which enables both the accurate targeting and recording or staking out of single points and also the efficient acquisition of large point clouds. To this end, the surveying instrument can be operated in at least three measurement modes—a single-point measurement mode, a scanning mode and the single-point scanning mode. An advantage consists of the fact that both methods which are conventionally carried out by total stations and methods which are carried out by laser scanners can be carried out by using only one surveying instrument according to the invention. It is particularly advantageous that these methods can also be carried out alternatively or in combination without a need for changing the employed surveying instrument. It follows that all measurement data can be acquired in a common coordinate system.

Further advantages emerge from the fact that, according to the invention, it is only a beam deflection unit that rotates with a high speed instead of the telescope, which beam deflection unit has a lower mass than a telescope (as is typically provided for total stations) and therefore enables higher rotational speeds.

The invention relates to a surveying instrument, comprising a beam source for generating measurement radiation, a base defining a vertical axis, and a structure pivotable about the vertical axis relative to the base, comprising a beam entry window and a beam exit window (wherein the beam entry window can be understood to mean an entry area and the beam exit window can be understood to mean an exit area), in particular wherein the beam entry window and the beam exit window are identical. Moreover, the surveying instrument comprises a beam deflection unit for varying the alignment of a measurement axis defined by an emission direction of the measurement radiation, wherein the beam deflection unit is rotatable about a horizontal axis relative to the structure and arranged relative to the structure in such a way that measurement radiation emerging from the beam exit window is incident on the beam deflection unit and can be guided by means of the latter to an object, and measurement radiation reflected by the object and incident on the beam deflection unit is directed thereby onto the beam entry window. Moreover, the surveying instrument comprises a distance measurement functionality for measuring the distance to the object by means of the measurement radiation, an angle measurement functionality for determining an alignment of the measurement axis relative to the base, a control and processing unit for data processing and for controlling the surveying instrument, and a scanning functionality. When the scanning functionality is carried out in an automatically controlled manner by the control and processing unit, there is scanning with rotating the beam deflection unit about the horizontal axis and pivoting the structure about the vertical axis, in particular simultaneously, with determining the respective distance and the respective alignment of the measurement radiation for scanning points lying within a certain scanning region, in particular with a predetermined scanning point resolution, and generating a point cloud comprising the scanning points.

Furthermore, the structure of the surveying instrument according to the invention comprises an imaging system comprising an imaging optical unit with a focusing group and an image plane for generating and graphically (visually) providing an image of a field of view, wherein the field of view is defined by the imaging system and the beam deflection unit and can be aligned together with the measurement axis by means of the beam deflection unit and the image of the field of view can be provided graphically (visually) in focus in the image plane by means of image focusing using the focusing group. Moreover, the surveying instrument has a single-point measurement mode, within the scope of which the measurement axis can be aligned onto a target point (which is not part of a multiplicity of measurement points in accordance with a scanning process, but rather should be considered a single target point), in particular onto a retroreflecting prism or reflection target marker, and, when a single-point measurement is triggered in an automatically controlled manner by the control and processing unit, the distance to the target point and the alignment of the measurement axis and a position of the target point can be determined depending on the distance and on the alignment of the measurement axis.

By way of example, within the scope of the invention, the radiation source can be embodied as a laser diode and the measurement laser radiation, which can be emitted thereby, can be guided through the beam exit window or the beam entry window of the structure, which window can, for example, be embodied by an optically transmissive medium. Here, the radiation can be guided by means of an imaging system (optical unit) arranged in the structure, wherein this imaging system may comprise e.g. beam deflection elements, zoom and/or focusing components, an image acquisition unit, the radiation source, a detector, a rangefinder or a distance measurement module and/or a position-sensitive detector or an image-based measurement camera.

When leaving the structure, the measurement radiation is directed through the beam exit window onto the beam deflection unit, which can, for example, be configured as a reflecting element, in particular as a mirror, and the alignment of said measurement radiation can be varied by rotating the beam deflection unit. In the reverse direction, measurement radiation, which is reflected back to the surveying instrument at an object and directed by the beam deflection unit through the beam entry window, can thus be provided in the structure or to the imaging system for determining the distance.

A point cloud within the scope of the scanning functionality is acquired by rotating the beam deflection unit and pivoting the structure such that the measurement axis can be deflected in two directions, and hence a previously defined scanning region can be scanned. In the process, it is moreover possible to determine a point resolution, i.e., for example, the number of points to be acquired in the scanning region.

For the purposes of the provision, according to the invention, of an additional single-point measurement mode, a focusing group and an imaging system are provided in such a way that an image of a field of view can be generated and provided as an image in an in-focus viewer. The field of view defined by the imaging optical unit and the image plane is likewise aligned by the beam deflection unit, wherein the form of the field of view can moreover be influenced by the optical properties of the imaging system and the beam deflection unit.

By way of example, a rotary knob or a pushbutton can be arranged on the structure for focusing the image; if said rotary knob or pushbutton is actuated, components of the focusing group are adjusted relative to one another in such a way that the image is provided in a sharper or less sharp state.

Within the scope of the single-point measurement mode, a target point can be targeted very precisely with the geodetic accuracy, in particular by an appropriate alignment of the beam deflection unit. Furthermore, coordinates or target points can be transmitted into the field (staking out points) within the scope of the single-point measurement mode, wherein the coordinates or position elements are available in a storage medium and the beam or image deflection unit is aligned manually or automatically in the direction of the respective point to be staked out. Moreover, a repetitive tracking function, known to the surveyor, is classified under the single-point measurement mode designation. By means of the single-point measurement mode, it is therefore possible to determine a distance to the target point, a direction in azimuth and elevation and therefore a target point position with second (of arc) accuracy by a precise alignment of the measurement axis.

In respect of the alignment of the beam deflection unit, the structure can, according to the invention, comprise an adjustment mechanism with a rotary knob or pushbutton for aligning the beam deflection unit, wherein the beam deflection unit can be aligned by manual actuation of the rotary knob. Here, the adjustment mechanism can have different transmission ratios for aligning the beam deflection unit or the structure. By way of example, provision can be made for a coarse drive and a fine drive, wherein the coarse drive as a transducer for the motor-driven shaft drive may have a transmission of e.g. 1:1 or 5:1 in respect of the rotation of the beam deflection unit and the fine drive may have a transmission of e.g. 200:1, i.e. there is one rotation of the beam deflection unit for every 200 rotations of the fine drive. Moreover, one rotary knob can in each case be connected to one of the drives and thereby provide manual adjustment. Additionally, a motor can be assigned to each drive, as a result of which the beam deflection unit can be aligned in a motorized manner.

In order to provide the image, in particular to a user of the surveying device, the structure can comprise an eyepiece for graphic or visual provision of the image, in particular together with a marking, e.g. a reticle, displaying the emission direction or target direction. Here, the eyepiece can be arranged on the structure in such a way that the image in the image plane can be registered by a user when peering through the eyepiece. Therefore, the eyepiece can depict the image in such a way that a user can perceive the latter in focus. A target point can therefore be observed in measurement surroundings through the eyepiece and the measurement axis can be aligned on the target point, in particular for carrying out a single-point measurement.

When using a purely visual targeting device, the image may rotate about the target axis depending on the elevation angle of the beam deflection unit. By way of example, the image can be seen rotated by 90° at the zenith and rotated by 180° in a second horizontal position. For an adapted display of the image, use can be made, in particular, of an electronic viewing system in conjunction with a camera, wherein, for example, a rotation of the acquired image is brought about depending on the elevation angle. By way of example, high-resolution OLED displays are known in conjunction with camcorders, which OLED displays are able to generate the visual information in the image plane and wherein the image can be provided to the eye in a magnified manner by means of an eyepiece. In this context, the imaging system or the structure of a surveying instrument according to the invention may comprise a measurement camera for capturing the image, in particular wherein the graphic provision of the image is brought about by means of an electro optical viewer interacting with the measurement camera. Here, the measurement camera is provided for recording an image corresponding to the field of view of the imaging system and can in each case acquire an image in accordance with the field-of-view alignment defined by the position of the beam deflection unit and of the structure, and provide signals for the graphic display of the image. The signals can be transmitted to an electro optical viewer, e.g. a display, as a result of which the acquired image can be displayed thereon.

By way of example, the field of view can thus be imaged in the beam path, e.g. in the optical unit or in the imaging system, by means of the measurement camera, and the image can be depicted on the display and observed through the eyepiece.

Additionally, according to the invention, the structure can comprise an overview camera with an overview field of view, wherein the overview field of view is greater than the field of view of the measurement camera, in particular wherein the overview field of view can be aligned by means of the beam deflection unit.

Therefore, a larger region of the terrain, in which e.g. the target point is situated, can be acquired by means of the overview camera and output e.g. on a display on the structure, as a result of which there can be improved orientation and faster targeting of a desired point. In the process, the overview field of view can be aligned by means of e.g. the front or back side of the beam deflection unit.

In respect of targeting of a desired target point, the imaging system can, according to the invention, comprise an optical zoom group for varying a linear magnification of the image on the image plane. Thus, for example, target points both at a large distance and in the vicinity of the surveying instrument can be provided with such magnification that, for example, a user can identify the target point in a clear and positionally accurate manner in each case. In the case of an electro optical viewing system, a change in the linear magnification may also be carried out electronically in such a way that the relevant image section (ROI, region of interest) is reduced and hence a zoom effect is created on the display. In the process it is not e.g. the image, which can be acquired completely depending on the camera resolution, but a region that is selected in such a way that no reduction in resolution is generated in the case of an image display.

According to the invention, the beam deflection unit can be embodied as a reflecting deflection element, in particular as a mirror. Alternatively, the beam deflection unit can ensure the deflection of the measurement radiation or of the field of view by means of a suitable arrangement of optical components.

In addition to the scanning functionality and to the single-point measurement mode, a surveying instrument according to the invention may comprise a single-point scanning functionality, wherein, when carrying out the single-point scanning functionality, the distance and the alignment of the measurement radiation are determined in each case for a multiplicity of single points within a single-point region, a single-point point cloud comprising the single points is generated and the position of the target point is derived from the single-point point cloud by means of an algorithm for point cloud analysis. This functionality optionally implies image processing processes in order to analyze images or point clouds acquired within the scope of the single-point region and in order to determine a target point on the basis of these analyses. In general, the position of the target point can be determined by means of algorithms for processing 3D point clouds.

According to the invention, the measurement of distances to target points or scanning points can be brought about by means of a distance measurement unit, wherein the measurement unit can be operated in two different modes. In particular, the distance to the target point can be determined in a first distance measurement mode in the single-point measurement mode, wherein a certain number of distance measurement values are determined and averaged for the target point. Moreover, within the scope of the scanning functionality, the distance to the scanning points can be determined in a second distance measurement mode, wherein, compared to the first distance measurement mode, a fewer number of distance measurement values, in particular a single distance measurement value, is/are determined for, in each case, one of the scanning points and optionally averaged.

By using the measurement modes with the respective surveying objects in such a way, it is possible to carry out different measurements with e.g. different measurement accuracies or point resolutions using only one structural distance measurement functionality and the selective operating modes for this functionality. Thus, a high measurement accuracy, which can be realized by averaging a multiplicity of measurement values, can be achieved for determining a single point position. Moreover, a larger number of measurement points can be acquired in terms of position within the scope of scanning with a lower accuracy.

Furthermore, according to the invention, the surveying instrument can comprise a switching function configured in such a way that, when the switching function is carried out, there is a switch between the single-point measurement mode and the scanning functionality, in particular between the single-point measurement mode, the scanning functionality or the single-point scanning functionality, in particular depending on a user input. Hence it is possible, in particular, to provide simple switching between the different measurement modes for a user, wherein the user can switch merely by pressing the button from one mode to another.

In order to increase the measurement accuracy and the robustness or reliability of generated measured values, a surveying instrument according to the invention can comprise an inclination sensor for measuring a generally 2-dimensional inclination of the surveying instrument relative to the gravitational vector, wherein, depending on a measured inclination, a measured value for the alignment of the measurement radiation can be corrected. Therefore, a possible angle position of the surveying instrument relative to a horizontal or relative to the direction of the Earth's gravitational field can be determined by means of the inclination sensor, wherein the inclination values determined thereby can be used for correcting or compensating an alignment of the measurement axis.

Moreover, the inclination values can be output on a display on the structure and the surveying instrument can be aligned depending on these values.

In particular, according to the invention, the imaging system can comprise a beam variation module for attenuation and/or expansion and/or wavelength-dependent filtering by introducing the beam variation module in a beam path of the measurement radiation. Such an expansion or attenuation of the measurement radiation can be advantageous, in particular when using the surveying system as a total station, since the power of the measurement radiation may be set to be so high for carrying out the scanning functionality that if the same beam intensity is used for a single-point measurement, this can result in an overload of the detectors for receiving the measurement radiation (since the measurement points targeted in this case may be partially reflective or retroreflective and therefore do not reflect the measurement radiation back to the surveying instrument in a diffuse manner, but rather in a direct manner).

One aspect of the invention relates to fine targeting and tracking of targets, in particular continuous tracking. According to the invention, the structure can, for this purpose, comprise a targeting and target-tracking device with a position-sensitive detector, wherein measurement radiation reflected at a reflector unit (e.g. target marker or reflector) can be acquired by the position-sensitive detector and an offset of the acquired measurement radiation relative to a reference point on the (area) detector can be determined, in particular wherein the targeting and target-tracking device can be arranged in the imaging system. In the simplest case, the reception-side imaging system of the target tracking device in this case merely consists of a lens with a constant focal length, for example from the optical components in front of the focusing unit of the above-described imaging system. The targeting and target tracking device can, according to the invention, comprise a further beam source for emitting laser radiation, in particular wherein laser radiation reflected at the reflector unit (e.g. target marker or reflector) can be used as measurement radiation for determining the offset on the position-sensitive detector. Moreover, according to the invention, the measurement axis can be aligned in an automatically controlled manner depending on the offset in such a way that the measurement radiation is continuously aligned onto a center of the reflector unit.

Despite the often provided very large optical magnification, target objects cannot be targeted precisely enough with the naked eye on the basis of the targeting apparatus, which is why conventional surveying instruments may comprise an automatic targeting and target tracking device with the corresponding functionality for triple prisms or a reflection film acting as a reflector unit (ATR: "automatic target recognition"). By way of example, EP 2 141 450 describes a surveying instrument with such a function for automatic targeting of a retroreflecting target and with an automatic target tracking functionality.

Within the scope of the ATR fine targeting function using the targeting and target tracking device, the measurement beam or a specific, generally strongly divergent ATR measurement beam can, in the process, be emitted in the direction of the targeting direction (measurement axis), said beam can be retroreflected at the target and the reflected beam can be acquired by the position-sensitive detector (ATR sensor). Here, depending on the deviation of the alignment of the measurement axis from the center of the reflector unit, the incident position of the reflected radiation on the position-sensitive detector (ATR sensor) also deviates from a central sensor area position. The ATR measurement radiation retroreflected on the reflector unit generates a light spot on the ATR area sensor (CCD camera, CMOS sensor, position-sensitive detector), which light spot does not lie at the calibrated zero of the ATR area sensor. The deviation between ATR position signals and the zero indicate the directional deviation in the azimuth and elevation from the intended position. Here, the zero corresponds to the measurement axis of the system according to the invention, to which the angle measurement sensors for the azimuth and elevation relate. By using the measured directions to the intended position, the alignment of the beam deflection unit can be updated in a motorized manner in such a way that the ATR measurement beam retroreflected at the reflector unit is incident highly precisely at the center of the sensor area on the ATR area sensor (i.e. the horizontal or azimuth angle from the beam deflection unit and the vertical or elevation angle of the structure are modified and adapted iteratively in such a way until the center of the reflection spot coincides with the intended position on the ATR area sensor). Alternatively, a residual deviation between point of incidence of the retroreflected ATR measurement beam on the ATR sensor and the zero of the sensor area can also be taken into account by calculation and converted into a corresponding angle which is appropriately added to the direction—acquired by the angle sensors—pointing in the direction of the measurement axis. That is to say, the direction to a marked target point can in this case also be derived from the direction of the measurement axis—acquired by the angle sensors—and an offset of the detected ATR measurement beam reflection from the sensor center (i.e. from the calibrated zero on the ATR sensor on which the target axis of the system is imaged). As a result, the achievable accuracy when aligning the beam deflection unit (and the structure) with respect to a triple prism or target marker can be significantly increased compared to manual targeting using a reticle and based on pure visual judgment.

In order to find target markers such as reflex films quickly, the structure according to the invention can comprise a target search module with a transmission unit for emitting search radiation in the form of a light fan and a reception unit for detecting at least part of reflected search radiation.

Here, the target search module (power search) can be securely placed on the structure and therefore be pivotable by 360° about the vertical or horizontal axis. The transmission unit and the reception unit can be arranged biaxially with respect to one another and can span two vertical light fans placed next to one another. The transmission unit can emit a signal which can be reflected by a cooperative target, received by the reception unit and evaluated according to amplitude and travel time in real time. Thus, it is possible, for example, to establish distance and degree of reflection of the target object and identify potential targets.

A further aspect of the invention relates to a measurement method for determining the position of at least one point using a surveying instrument according to the invention, wherein, within the scope of the measurement method, a scan or a single-point measurement is carried out selectively by being selected by a user. Here, the scan comprises rotating the beam deflection unit about the horizontal axis and pivoting the structure about the vertical axis, in particular simultaneously, determining the respective distance and the respective alignment of the measurement radiation for the scanning points within a certain scanning region, in particular with a predetermined scanning point resolution, and generating a point cloud comprising the scanning points. The single-point measurement comprises highly precisely aligning the measurement radiation onto a target point, determining the distance to the target point and aligning the measurement axis, and determining a position of the target point depending on the distance and on the alignment of the measurement axis.

BRIEF DESCRIPTION OF THE DRAWINGS

The device according to the invention and the method according to the invention are described in more detail below in a purely exemplary manner on the basis of specific exemplary embodiments which are schematically depicted in the drawings, with further advantages of the invention also being discussed. In detail:

FIG. 3 shows a further embodiment of a surveying instrument according to the invention;

FIGS. 4a-b respectively show a beam variation module for a surveying instrument according to the invention;

FIGS. 6a-c respectively show an embodiment of an imaging system for a surveying instrument according to the invention.

DETAILED DESCRIPTION

Figure 1:
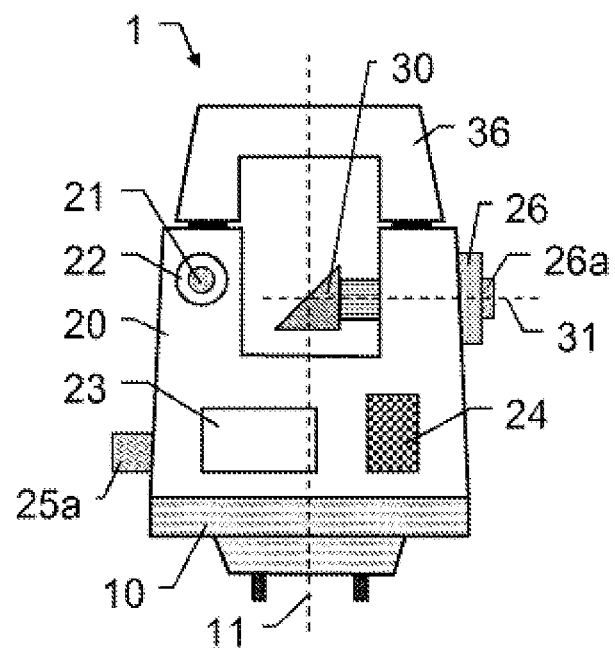
FIG. 1 shows a back view of a first embodiment of a surveying instrument according to the invention.

FIG. 1 shows a back view of a first embodiment of a surveying instrument 1 according to the invention. The surveying instrument 1 in accordance with FIG. 1 comprises a base 10 defining a vertical axis 11 and a structure 20, wherein the structure 20 is pivotable relative to the base 10 about the vertical axis 11. An eyepiece 21 for outputting image information, comprising a rotary knob or transducer 22 is provided on the structure 20, wherein focusing of the output image information can be varied by actuating the rotary knob 22. Moreover, a display 23 and an operating field or input field 24 for controlling the surveying instrument 1 are installed on the structure 20. An adjustment rotary knob 25a for an adjustment mechanism renders it possible to pivot the structure 20 relative to the base 10 manually about the vertical axis, wherein motorization for such pivoting is additionally provided in the structure 20 and the pivoting can therefore be brought about in a controlled manner. As an alternative or in addition to aligning the structure 20 by means of the adjustment rotary knob 25a, said structure can be aligned approximately in a manual manner by rotation. Analogously, a beam deflection means 30 can be rotated manually about a tilt axis or horizontal axis 31 by means of a second adjustment rotary knob 26, which interacts with a coarse drive, wherein motors for controlled motorized rotation of the beam deflection unit 30 are also provided in the structure 20 in this case. Furthermore, the beam deflection unit 30 can be aligned very precisely by means of a further fine adjustment rotary knob 26a or control pushbutton, which is connected to a fine adjustment mechanism. When actuating the rotary knob 26a, the beam deflection unit 30 is co-rotated with a specific rotational transmission in such a way that, for example, there is one rotation of the beam deflection unit 30 in the case of ten or two hundred rotations of the rotary knob 26a. The transmission ratio can also be designed to be adaptive by means of an electronic transducer, for example by increasing the rotational transmission as the speed of the rotational movement decreases. By means of the capability to align the beam deflection unit 30 provided thus, it is possible to align a measurement laser beam on a target, both in a manual and controlled automatic manner (by means of the motors connected to the respective drives). By way of example, a user can in this case peer through the eyepiece 21 and make a superposed reticle coincide with a measurement point.

Here, an image comprising the measurement point is directed to a camera via e.g. the beam deflection unit and an imaging system. After carrying out image transformations (rotation, distortion and coordinate corrections), the camera image has a reticle superposed thereon and is displayed e.g. on an electro optical viewer, wherein the image can be observed by the user by means of the eyepiece 21. As an alternative thereto, the image can be displayed on the viewer 23, in particular superposed with additional information. The operating field 24 renders it possible to change settings or enter additional data.

Moreover, the beam deflection unit 30 is used to align a field of view for acquiring an image. Here, the field of view is aligned relative to the measurement beam in such a way that a measurement axis defined by the measurement beam lies in this field of view or is aligned parallel or coaxially with respect to an acquisition direction for the image acquisition. An image which can be acquired thus can be imaged on the measurement camera in the surveying instrument 1 and for example be provided on the display 23 and/or by means of a micro-display with eyepiece 21. As a simplest exemplary embodiment, a continuous viewing channel with optical components can be provided between the eyepiece 21 and the beam deflection unit 30. In this context, the display 23 can be embodied as a touch-sensitive display 23, wherein the surveying instrument 1 can be controlled by means of touch and triggering of commands connected therewith.

Moreover, the surveying instrument 1 comprises a handle 36, which can be removed from the instrument 1 in a modular manner. If the handle 36 is removed, it is possible to acquire an increased scanning region within the scope of e.g. a scanning process, wherein it is then additionally possible to acquire a region which was previously screened by the handle 36.

Figure 2:
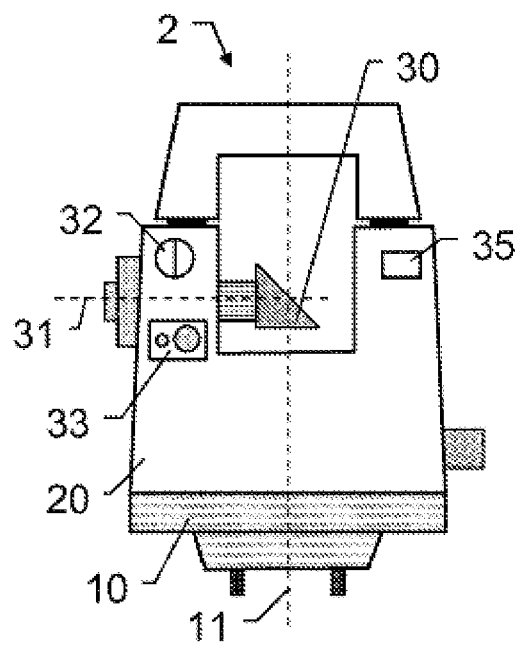
FIG. 2 shows a front view of a further embodiment of a surveying instrument according to the invention.

FIG. 2 shows the front view of a surveying instrument 2 according to the invention. The base 10 once again defines a vertical axis 11 and the structure 20 of the surveying instrument 2 is arranged in a pivotable manner relative to the base 10 about the vertical axis 11. Moreover, provision is made in a rotatable manner about a horizontal axis 31 relative to the structure 20 for a beam deflection unit 30, which comprises a mirror element for deflecting the laser measurement beam and the field of view for image acquisition.

The surveying instrument 2 is equipped with an additional overview camera 35 which comprises a comparatively large (compared to the measurement camera) horizontal angular range of e.g. 10-40° and therefore can be used for acquiring an overview image. Since the image region in such a configuration cannot be changed in the vertical direction, a lens of the overview camera 35 can furthermore be embodied in such a way that it can additionally image a large vertical angular range. As an alternative thereto, a plurality of camera modules with different vertical alignments could be arranged one above the other in place of the single overview camera 35.

In view of staking out known coordinates in the terrain, the alignment of a measurement instrument with respect to the target line can constitute a time-consuming process (because it is iterative). Here, the direction of the measurement beam or a laser pointer is referred to as target line. For finding the target line more easily, the surveying instrument 2 according to the invention is equipped with an EGL (emitting guide light) module 32. This module 32 visualizes, on the one hand, the target line and, on the other hand, a solid angle range including the target line in a symmetric manner.

By way of example, two light cones, which include the target line e.g. in an angular range of typically +/−5°, can mark the solid angle ranges to the left and right. In the case of a laser pointer as a target line generator, the target line can also be spatially marked using a single light cone, with the light cone enclosing the target axis in a symmetric manner in this case preferably being not expanded by more than +/−2°. The basic functionality of an EGL module 32 is already known in conjunction with modern total stations from the prior art.

Moreover, the surveying instrument 2 comprises a first embodiment of a target search module 33 (power search), wherein this module 33 is securely placed on the structure 20 and therefore pivotable about the vertical axis 11. The module 33 consists of a transmission apparatus and a reception apparatus, which are arranged biaxially with respect to one another and span two vertical light fans placed next to one another. By way of example, the transmission apparatus is pulse modulated. It emits a signal, which can be reflected by a cooperative target, received by the reception apparatus and evaluated according to amplitude and travel time in real time. By way of example, this is how distance and degree of reflection of the target object are established. In the case of an alternative embodiment of the module 33, transmission and reception beams can be pivoted in any vertical direction via a back-side area of the beam deflection unit 30; as a result, it is also possible to find target objects at large elevation angles.

A further embodiment for a device with a target search function can be formed by the scanning module itself using the rangefinder 51. Marked target points can be found by means of an overview scan, in which the whole surroundings are scanned in a short time with a high measurement rate and the degrees of reflection of the found target markers can be established.

FIG. 3 shows a further embodiment of a surveying instrument 1 according to the invention. Once again, the surveying instrument 1 comprises a base 10, a structure 20 and the respective rotational axes, i.e. a vertical axis 11, about which the structure 20 can be pivoted, and a horizontal axis 31, about which the beam deflection unit 30 is rotatable. Furthermore, said surveying instrument is provided with a spindle 41 connected to the manually operable adjustment rotary knob 25*a*, by means of which spindle the structure 20 is pivoted relative to the base 10. Moreover, a first motor 43 interacts with the pivot device in such a way that pivoting can alternatively also be brought about in a controlled manner by means of the motor. Moreover, an angle sensor 42, for example an angle encoder with a micro-radian resolution, for measuring a relative position of the structure 20 relative to the base 10 is arranged on the pivot device. By means of a second angle sensor 46, it is additionally possible to determine and, in particular, continuously measure a relative position between the beam deflection unit 30 or a mechanical shaft 47 and the structure 20. Here, a second motor 45 is arranged on the mechanical shaft 47 in such a way that the beam deflection unit 30, which is connected to the mechanical shaft 47, can be rotated by means of the motor 45. Moreover, provision is once again made for the coarse adjustment rotary knob 26 for coarse alignment, which renders a coarse drive controllable, and for a further fine adjustment rotary knob 26*a*, which is connected to a fine drive, for highly precisely aligning the beam deflection unit 30. The guide variable generated by the fine adjustment rotary knob 26*a* is, for example, processed by an electronic fine drive unit in order to adjust the second motor 45 in very fine angular steps, and thereby align the measurement beam on the target with sub-second of arc accuracy.

The structure 20 furthermore comprises an imaging system 50 with a rangefinder or distance measurement module 51 and a camera 52, wherein the beam source for preferably pulse-modulated emission of the measurement radiation 55 is additionally assigned to the distance measurement module 51. The measurement radiation 55 is emitted by means of the imaging system 50 in the direction of the beam deflection unit 30 and deflected or reflected on the latter at a defined angle. After the radiation 55 was scattered or reflected at a target and radiated back to the surveying instrument 1, the radiation 55 is once again routed by means of the beam deflection unit 30 via the imaging system 50 to the distance measurement module 51. By means of the distance measurement module 51, it is possible to determine a polar distance to the target. Moreover, a field of view 56 is aligned or varied by means of the beam deflection unit 30. Here, the field of view 56 is defined at least by the optical properties of the imaging system 50, i.e., for example, of the camera 52 and further optical components for guiding the radiation to be acquired by the camera 52, and by the optical properties of the beam deflection unit 30.

Using such an arrangement, the measurement direction defined by the measurement radiation 55 can be acquired using an image that can be acquired by the camera 52. Furthermore, the measurement radiation 55 can be e.g. aligned exactly on a target on the basis of this acquisition. Thus, an optical output can be continuously provided to a user, wherein both an image corresponding to the current field-of-view alignment and a marker displaying the measurement direction or the measurement axis are output. On the basis of this output, it is thus possible to align the measurement radiation 55, for example by bringing the displayed measurement direction and a desired target in the image into correspondence.

Moreover, an inclination sensor 44 is provided in the structure 20 in order to acquire the angle position of the surveying instrument 1 with respect to the gravitational vector and optionally to enable a correction or compensation of the measurement values on the basis of the measured inclination.

Using such a surveying instrument 1 according to the invention, a horizontal and vertical angular range and a point resolution can be defined within the scope of a scanning process, in a manner analogous to known laser scanners. During a continuous distance measurement using the distance measurement module 51 based thereon, the beam deflection unit 30, driven by the motor 45, rotates at a high speed about the horizontal axis 31 and the structure 20, driven by the motor 43, rotates at a lower speed about the vertical axis 11 such that the modulated laser beam 55 passes over the whole angular range to be surveyed. The respective alignment of the measurement beam 55 is acquired by the angle sensors 42, 46 in a manner concurrent with the distance measurement. By linking these values, it is then possible to calculate the coordinates of the measurement points acquired thus.

By means of a suitable synchronization of the angle sensors, two angles and at least one distance measurement can be combined simultaneously to form a polar 3D coordinate. A known trigger and synchronization concepts is based on the elevation angle sensor as a trigger source. An advantage of this method is that the angle distances between the measurement points are equal with high precision. In the case of asynchronous sensors, the adjacent measurement values are preferably interpolated in real time ("realtime").

Here, the distance can be measured simultaneously with in each case one angle measurement or carried out at a lower measurement rate. In the latter case, the distance assigned to an angle measurement is interpolated on the basis of the measured distances.

Furthermore, a single-point scanning functionality can be carried out, wherein a single point is determined on the basis of the recorded scanning data. To this end, a measurement point is first of all targeted approximately. After triggering the single-point scanning functionality, the surveying instrument 1 starts a scanning process and acquires a point cloud in predefined surroundings around the targeted direction or around the approximately targeted measurement point.

After the recording, the point cloud is analyzed with respect to significant features (e.g. edges, corners) using appropriate algorithms and the coordinates of the measurement point are derived therefrom. Image data which were acquired with the measurement camera of the surveying instrument 1 can optionally also be used for determining the measurement point. By way of example, such a process for determining target points is described in the European patent application number 10162447.6.

FIGS. 4a and 4b each show a beam variation module 70 for a surveying instrument according to the invention.

These days, laser scanners are equipped with sensitive rangefinders, which are optimized for natural targets and, as a result thereof, can scan diffusely reflective surfaces with high measurement rates of up to several megapoints per second. By contrast, when surveying with total stations, use is usually made of reflector-assisted target markers in order to mark the target point very accurately. Such targets cannot be surveyed using conventional laser scanners since the signals would lead to an overload as a result of the high sensitivity thereof and the high degree of reflection.

Moreover, systematic distance deviations, which are induced by diffraction-dependent beam asymmetries or by time differences in the modulation pattern in the profile of the measurement radiation, and very slightly incorrect targeting of the reflective center may occur when using collimated measurement beams.

In order to use a surveying instrument according to the invention for measuring both diffusely reflecting, natural targets within the scope of the scanning functionality (surveying instrument as laser scanner) and reflector-assisted (or natural) target objects within the scope of the single-point measurement functionality (surveying instrument as a total station or theodolite), a beam variation module 70, which is e.g. embodied as beam expansion module and/or a beam attenuation module, can be integrated into the beam path of the laser beam. Natural targets can also be surveyed by means of a total station or within the scope of the single-point measurement functionality. The beam expansion module increases the divergence of the distance measurement beam, therefore expands the latter and simultaneously attenuates the measurement signal by means of the increased light fan. An advantage of the divergent laser beam is that it is no longer necessary for the reflecting target object to be targeted accurately for the distance measurement. By way of example, this can be advantageous in view of staking out points since the alignment with a direction to be staked out can be brought about significantly more quickly.

In respect of automatic target tracking of moving targets, for example on the basis of the ATR function, a further advantage of a divergent laser beam is that the target object does not move out of the transmission region of the distance measurement beam as quickly, and therefore a repetitive distance measurement is possible. Therefore, trajectory tracking can be ensured, even in the case of incorrect targeting due to the dynamics or in the case of inaccurate alignment with moving target objects.

The beam variation module 70 can be realized as a pinhole aperture 72, which can be pivoted in about a rotational axis 71 and which comprises an additional attenuation filter, for example photographic film, and can thereby generate an ideally fitted attenuation of the distance measurement beam (FIG. 4a). Here, the pinhole aperture 72, which can be pivoted in, can comprise a plurality of regions, wherein each region leads to a different attenuation and can be assigned to a corresponding target type. As a result, the level of a reception signal can be adapted to the corresponding target object by pivoting a filter into a specific region. Here, the degree of attenuation can be up to a factor of 100 000. As an alternative thereto, the beam variation module 70 can be realized as a graduated filter wheel.

Laser diodes, which may be used in a surveying instrument according to the invention, typically have an elliptic or strip-shaped emission surface, which can lead to relatively large time differences along the dimension of the long axis in the case of modulated radiation emission, and therefore makes precise distance measurements in the sub-millimeter range more difficult or impossible. By using a slotted aperture 73 in a beam variation module 70 (FIG. 4b) instead of the pinhole aperture 72, it is possible, for example, to eliminate the retarded light pulse components at the edge of the radiation beam. In this manner, it is possible to achieve a spatially flatter light pulse, accurate to picoseconds, and hence there can be an accurate distance measurement to reflector targets within the scope of the single-point measurement functionality (surveying instrument employed as total station or theodolite). As an alternative to an emission-side attenuator, or in combination therewith, an optical attenuator can be placed into the reception channel of the rangefinder. Very recent variable optical attenuators (VOAs), in particular fiber optic VOAs, are very fast and thereby render it possible to set the signal level of the rangefinder from measurement point to measurement point, even during the scanning process.

The setting of the distance measurement module can be varied according to whether single points are recorded (single-point measurement mode) or whether a scanning process is carried out (scanning functionality). The distance measurements can be carried out at high measurement rates for a scanning process. For the single-point measurement, a plurality of single measurements (millions of single measurements) can be averaged, which reduces the measurement rate but increases the accuracy of the distance measurement. Both the scanning mode and the single-measurement mode contain various subprograms which are known to a surveyor and have characteristic properties; for example, in the case of single-point measurement, there are "precision", "fast", "repetitive", "tracking" or "lock-in" measurement modes in addition to the "standard" measurement mode.

Figure 5A:
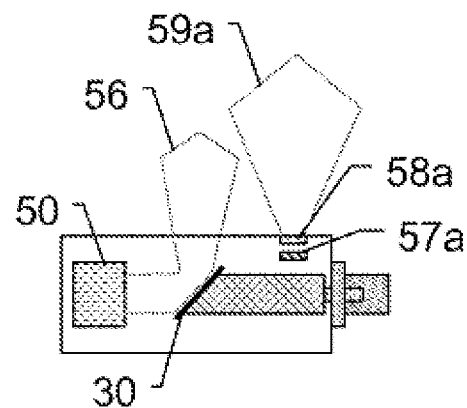
FIGS. 5a-c respectively show an embodiment for the arrangement of measurement camera and overview camera or for the alignment of the respective camera fields of view for a surveying instrument according to the invention.
Figure 5B:
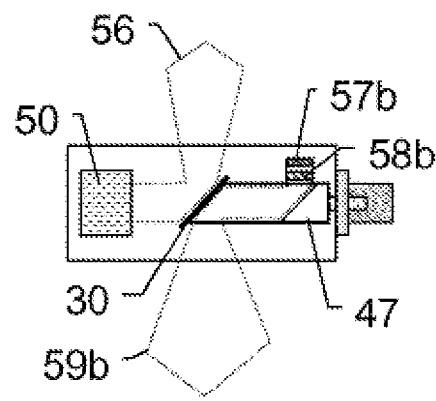
Figure 5C:
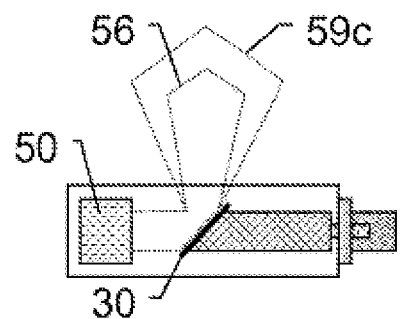

FIGS. 5a, 5b, 5c each show an embodiment for the arrangement of measurement camera (in the imaging system 50) and overview camera 57a-b or for the alignment of the respective camera fields of view 56, 59a-c for a surveying instrument according to the invention.

The field of view 56 of the measurement camera, which can e.g. be designed for a horizontal angular range of approximately 1°, is directed via the beam deflection unit 30 and the imaging system 50 onto the camera sensor installed in the imaging system 50. For the purposes of displaying the image on an electro-optic viewer, an image rotation, which results from the rotation of the beam deflection unit 30, can be corrected by calculation. At the same time, additionally occurring image aberrations, for example the distortion of the imaging system 50 can likewise be corrected by calculation.

In addition to the measurement camera, a surveying instrument according to the invention in accordance with FIG. 5*a* can be equipped with an additional overview camera consisting of a camera sensor 57*a* and a lens 58*a*, wherein the lens 58*a* can comprise a horizontal angular range of 10-40° and therefore be employed for acquiring an overview image. In this configuration, the field of view 59*a* cannot be modified in the vertical direction. Therefore, the lens can be embodied in such a way that it can additionally image a large vertical angular range. As an alternative thereto, a plurality of camera modules with different vertical alignments can be arranged one above the other in place of a single overview camera. In the shown embodiment, the camera sensor lens arrangement can be aligned by pivoting the structure of the surveying instrument.

A further embodiment according to the invention in accordance with FIG. 5*b* emerges when embodying the horizontal mechanical shaft 57 as a hollow shaft. As a result, the field of view 59*b* of a camera module consisting of a camera sensor 57*b* and an optical element 58*b* can be routed through the hollow shaft and directed onto the back side of the beam deflection unit 30. Here, the field of view 59*b* can also be varied in the vertical direction by rotating the beam deflection unit 30.

In a further embodiment in accordance with FIG. 5*c*, the imaging system 50 may comprise a mechanism similar to a zoom lens, which allows the angular range to be switched from 1° to e.g. 15°. As a result of the switch, the narrow field of view 56 can be changed to the image field for an overview image 59*c* (and vice versa). This zoom mechanism can be designed discontinuously for setting these two angle ranges, for example, to 1° and 15°, or can be continuously adjustable.

Figure 6C:
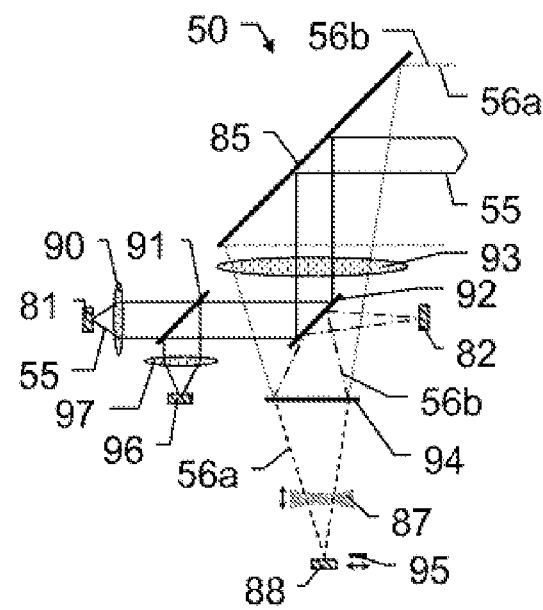

FIGS. 6*a*-*c* respectively show an embodiment of an imaging system 50 for a surveying instrument according to the invention.

FIG. 6*a* depicts a first embodiment of the imaging system 50, which corresponds to a catadioptric design. A laser transmission unit 81, e.g. a laser diode, transmits a measurement beam 55 to a first deflection mirror 84. From here, the measurement beam 55 can be incident e.g. directly on a beam deflection unit (not depicted here), e.g. a rotatable mirror, or on a second deflection mirror 85 and directed onto the beam deflection unit from there.

After the emitted beam 55 is reflected on the object or on a target, the beam 56*b* is directed to a primary mirror 86 via the rotatable beam deflection unit and, optionally, via the second deflection mirror 85, reflected on said primary mirror, transmitted to a coated, spectrally selective secondary mirror 83 and, from there, directed to the first deflection mirror 84 and onward to a laser reception unit 82.

The field of view 56*a* or the image information for the camera is likewise directed to the primary mirror 86 via the beam deflection unit and, optionally, via the second deflection mirror 85, reflected on said primary mirror, directed to the coated secondary mirror 83, reflected on the latter and directed to a focusing lens element 87 and onward to a photosensitive area sensor 88. Here, the focusing lens element 87 can be moved in such a way that a sharp image can be imaged on the photo-sensitive area sensor 88. Therefore, an image can be acquired by means of the area sensor 88 in such a way that the target on which the laser beam 55 is directed is imaged in the image. In a further embodiment, the module 87 can be provided with optical elements in order to set both the focus on the image plane and the linear magnification by means of a zoom mechanism.

A further embodiment of the imaging system 50 is depicted in FIG. 6*b*. The difference from the embodiment in accordance with FIG. 6*a* consists of the fact that the laser beam 56*b* reflected on the object is not incident once again on the first deflection mirror after reflection on the secondary mirror 83, but rather is coupled into a fiber ferrule and guided to the laser reception unit 82*a* via a fiber 89 (optical waveguide). Moreover, in this design, the focusing lens element is dispensed with and the sensor 88 instead has a movable embodiment such that the latter can be positioned in such a way depending on the object distance that a sharp image of the object can be generated.

Moreover, the beam deflection unit 30 is depicted; it provides a rotatable deflection of the transmitted measurement radiation 55 and of the received measurement radiation 56*b* or of the field of view 56*a* of the photo-sensitive area sensor 88 (after deflection by the second deflection mirror 85).

In accordance with a further embodiment (FIG. 6*c*), the imaging system 50 can also be embodied in accordance with a refractive design. The laser transmission unit 81 of a distance measurement module emits a laser beam 55, which is guided through a first deflection mirror 91 (dichroic beam splitter) in a manner slightly expanded by a positive lens element 90 and which is incident on a second deflection mirror 92. From there, the laser beam is reflected in the direction of the main lens 93 and directed to a third deflection mirror 85 and, from there, e.g. to the beam deflection unit (not depicted here).

After the beam 55 is reflected on the object, this beam 56*b* is directed through the rotatable beam deflection unit and, via the third deflection mirror 85, through the main lens 93 to a further, spectrally selective mirror 94. From there, the beam 56*b* is reflected at the second deflection mirror 92 and, from there, directed onward onto the laser reception unit 82.

The image field 56*a* of the sensor 88 is likewise guided via the beam deflection unit, via the third deflection mirror 85, through the main lens 93, the mirror 94, a focusing lens element 87 and, optionally, an infrared filter 95, which can be pivoted in, and onto the area sensor 88.

Additionally, the imaging system 50 comprises a second laser transmission unit 96, which can be used within the scope of an ATR functionality. This second laser transmission unit 96 emits an ATR laser beam, which is incident in a manner slightly expanded by a positive lens element 97 on a first deflection mirror 91 and, from there, guided onto a second deflection mirror 92. From the latter, the ATR laser beam is reflected in the direction of the main lens 93 and directed either directly onto the beam deflection unit (not depicted here) or onto the third deflection mirror 85 and, from there, onto the rotatable beam deflection unit.

After the ATR beam is reflected on the object, the latter takes the same path through the imaging system 50 as the camera image, i.e. it is guided via the third deflection mirror 85, through the main lens 93, the mirror 94, the focusing lens element 87 (optionally through the pivoted-in infrared filter 95) and onto a photo-sensitive area sensor 88.

The position of incidence of the ATR laser beam reflected by a target object can be detected by means of the photosensitive area sensor 88 and position-determining image evaluation software and, hence, an offset of this position relative to a reference position can be determined. Alternatively, an additional detector can be provided e.g. in the imaging system 50 for such a position-sensitive determination, wherein the ATR radiation can be coupled out of the common beam path by means of e.g. a coated mirror or a beam splitter. On the basis of the beam offset which can be determined thus, the measurement beam can continuously track a target (reflector), in particular under automatic control by means of the motors for aligning the structure and the beam deflection unit, and thus be coupled to the reflector.

Figure 7A:
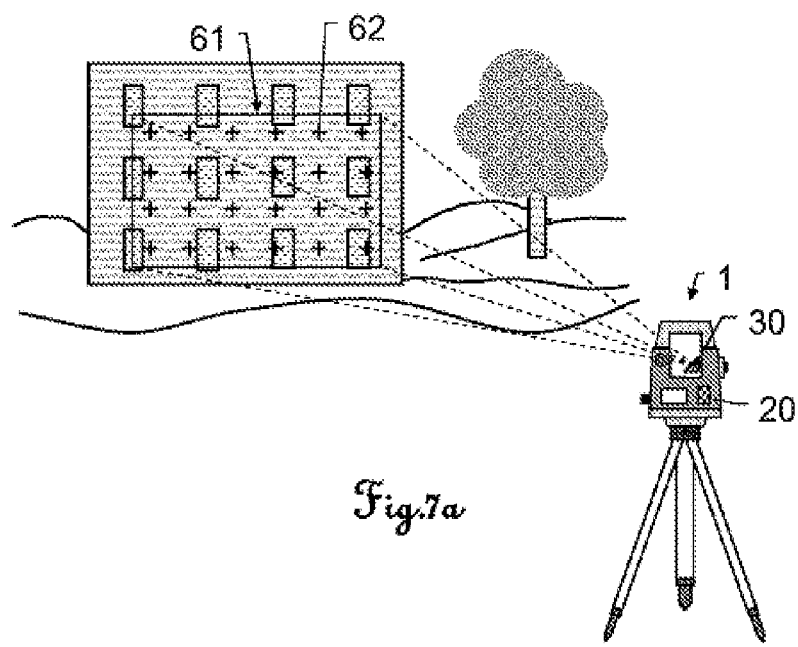
FIGS. 7a-b show a surveying instrument according to the invention when carrying out a scanning function or a single-point measurement.
Figure 7B:
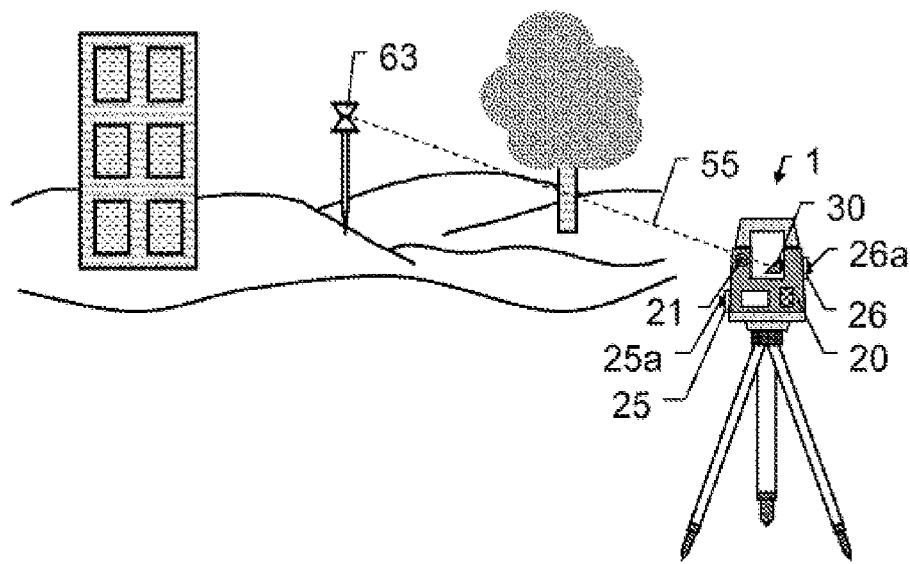

FIGS. 7a and 7b show a surveying instrument 1 according to the invention, wherein a scanning function and a single-point measurement are respectively carried out by the surveying instrument 1.

When the scanning functionality is carried out (FIG. 7a), a horizontal and vertical angular range 61, which is intended to be scanned, and a point resolution of the scanning points 62 to be acquired are defined, in a manner analogous to known laser scanners. The surveying instrument 1 is equipped for rangefinding using a distance measuring functionality, which comprises a laser transmission unit and laser reception unit. The measurement laser beam of the surveying instrument 1 is guided by rotating the beam deflection unit 30 and pivoting the structure 20 in such a way that the defined angular range 61 is passed over. In the process, a distance and, respectively, a horizontal angle and vertical angle are determined for each scanning point 62. From these values, a point cloud representing the scanning range 61 can subsequently be derived. Additionally, the angular range 61 can be acquired graphically by means of the measurement camera.

FIG. 7b shows the embodiment of a single-point measurement mode using the surveying instrument 1 according to the invention, as can be carried out in an analogous manner by total stations. In the single-point measurement mode, the surveying instrument 1 is aligned precisely on the measurement point. In this case, the measurement point is defined as a reflector 63. The measurement beam 55 can be aligned by rotating the structure 20 about a vertical axis and by rotating the mirror 30 about a horizontal axis. Here, the rotation can in each case be undertaken manually by means of actuating a coarse adjustment rotary knob 25, 26, wherein, for example, the rotation of the rotary knob and of the mirror 30 takes place with a ratio of 1:10. The highly precise alignment can be brought about by the actuation of respective fine adjustment rotary knobs or pushbuttons 25a, 26a, which interact with respective fine drives. In the process, the user can peer through the eyepiece 21 and make a reticle coincide with the center of the reflector 63. In the process, the image of the reflector 63 is directed e.g. via the rotatable mirror 30 to a camera. The camera image can be superposed with the reticle after carrying out image transformations (rotation, corrections) and for example displayed on an electro optical viewer, where it can be observed by the user via the eyepiece 21. As an alternative thereto, the image can be depicted on a viewer of the surveying instrument 1 or of the peripheral instrument—such as the data logger—used for remote control.

Here, the imaging system has the functionality of a telescopic sight, which allows continuous focusing both on objects in the near region, i.e. at a distance from 1 m, and at large distances up to several kilometers.

As a result of this functionality, focusing and therefore exact targeting of objects at different distances is made possible for the user.

The focus position can be adjusted by rotating a rotary knob or by actuating two push buttons labeled "forward" and "backward". In addition to manual focusing, the surveying instrument can also comprise the functionality of an autofocus.

Here, the distance measurement module can be designed in such a way that it provides a distance measurement functionality for both the scanning modes and the single-point measurement modes. In this context, the distance to the reflector 63 (target point) can be determined in a first distance measurement mode in the single-point measurement mode, wherein a certain number of distance measurement values are determined and averaged for the reflector 63. By cumulating measurement values in a specific alignment of the measurement beam 55, cumulated values can be averaged and the distance value can be determined therefrom.

Moreover, the distance to the scanning points 62 can be determined in a second distance measurement mode within the scope of the scanning functionality, wherein, compared to the first distance measurement mode, a fewer number of distance measurement values, in particular a single distance measurement value, is/are determined for, in each case, one of the scanning points 62 and optionally averaged. As a result, scanning of surroundings with a low measurement accuracy but with a larger number of acquired points is made possible.

The distance measurement module emits a measurement beam 55 which can be aligned on the reflector 63 via the imaging system and the mirror 30, reflected on said reflector and be incident on the laser reception unit again via the mirror 30 and the imaging system. The distance between the surveying instrument 1 and the measurement point 63 can be established on the basis of transmitting and receiving the laser beam 55. The coordinates of the measurement point 63 can be derived from the distance together with the direction of the laser beam 55 or a camera-tied target line, which is defined by the alignment of the structure 20 and the mirror 30 and can be measured by the angle sensors. The camera-tied target line can be interpreted as a replacement for the visual target line of a conventional total station.

The surveying instrument is additionally equipped with motors, which can bring about a rotation of the structure 20 and of the mirror 30 and therefore enable an automatic alignment in a predetermined direction.

It is understood that these depicted figures only schematically illustrate possible exemplary embodiments. According to the invention, the various approaches can be combined both with one another and with systems and methods for surveying surfaces or objects and with geodetic surveying instruments from the prior art.

What is claimed is:
1. A surveying instrument, comprising
a beam source for generating measurement radiation,
a base defining a vertical axis,
a structure pivotable about the vertical axis relative to the base, comprising a beam entry window and a beam exit window, wherein the beam entry window and the beam exit window are identical,
a beam deflection unit for varying the alignment of a measurement axis defined by an emission direction of the measurement radiation, wherein the beam deflection unit
is rotatable about a horizontal axis relative to the structure and
is arranged relative to the structure in such a way that measurement radiation emerging from the beam exit window is incident on the beam deflection unit and can be guided by means of the latter to an object, and measurement radiation reflected by the object and incident on the beam deflection unit is directed thereby onto the beam entry window, a range finder for measuring the distance to the object by means of the measurement radiation, an angle sensor for determining an alignment of the measurement axis relative to the base, a control and processing unit for data processing and for controlling the surveying instrument, and a scanning functionality, wherein, when the scanning functionality is carried out in an automatically controlled manner by the control and processing unit, there is scanning with rotating the beam deflection unit about the horizontal axis and pivoting the structure about the vertical axis simultaneously, determining the respective distance and the respective alignment of the measurement radiation for scanning points lying within a certain scanning region with a predetermined scanning point resolution, and generating a point cloud comprising the scanning points, wherein the structure furthermore comprises an imaging system comprising an imaging optical unit with a focusing group and an image plane for generating and graphically providing an image of a field of view, wherein the field of view is defined by the imaging system and the beam deflection unit and can be aligned together with the measurement axis by means of the beam deflection unit and the image of the field of view can be provided graphically in focus in the image plane by means of image focusing using the focusing group, and the surveying instrument has a single-point measurement mode, within the scope of which the measurement axis can be aligned onto a target point, and when a single-point measurement is triggered in an automatically controlled manner by the control and processing unit, the distance to the target point and the alignment of the measurement axis and a position of the target point can be determined depending on the distance and on the alignment of the measurement axis.

2. The surveying instrument as claimed in claim 1, wherein the structure comprises an adjustment mechanism with a rotary knob for aligning the beam deflection unit, wherein the beam deflection unit can be aligned by manual actuation of the rotary knob.

3. The surveying instrument as claimed in claim 1, wherein the structure comprises an eyepiece for graphic provision of the image.

4. The surveying instrument as claimed in claim 1, wherein the structure comprises a marking displaying the emission direction.

5. The surveying instrument as claimed in claim 1, wherein the structure comprises a measurement camera for acquiring the image, wherein the graphic provision of the image is brought about by means of an electro optical viewer interacting with the measurement camera.

6. The surveying instrument as claimed in claim 4, wherein the structure comprises an overview camera with an overview field of view, wherein the overview field of view is greater than a field of view of the measurement camera, wherein the overview field of view can be aligned by means of the beam deflection unit.

7. The surveying instrument as claimed in claim 1, wherein the imaging system comprises an optical zoom group for varying a linear magnification of the image on the image plane, and/or the beam deflection unit is embodied as a reflecting deflection element.

8. The surveying instrument as claimed in claim 1, wherein the surveying instrument furthermore comprises a single-point scanning functionality, wherein, when carrying out the single-point scanning functionality, the distance and the alignment of the measurement radiation are determined in each case for a multiplicity of single points within a single-point region, a single-point point cloud comprising the single points is generated and the position of the target point is derived from the single-point point cloud by means of an algorithm for point cloud analysis.

9. The surveying instrument as claimed in claim 1, wherein, in the single-point measurement mode, the distance to the target point is determined in a first distance measurement mode, wherein a certain number of distance measurement values are determined and averaged for the target point, and, within the scope of the scanning functionality, the distance to the scanning points is determined in a second distance measurement mode, wherein, compared to the first distance measurement mode, a fewer number of distance measurement values is/are determined for, in each case, one of the scanning points and optionally averaged.

10. The surveying instrument as claimed in claim 1, wherein the surveying instrument comprises a switching function configured in such a way that, when the switching function is carried out, there is a switch between the single-point measurement mode and the scanning functionality.

11. The surveying instrument as claimed in claim 1, wherein the surveying instrument comprises a switching function configured in such a way that, when the switching function is carried out, there is a switch between the single-point measurement mode and the single-point scanning functionality.

12. The surveying instrument as claimed in claim 1, wherein the surveying instrument comprises an inclination sensor for measuring an inclination of the surveying instrument relative to the gravitational vector, wherein, depending on a measured inclination, a measured value for the alignment of the measurement radiation can be corrected.

13. The surveying instrument as claimed in claim 1, wherein the imaging system comprises a beam variation module for attenuation and/or expansion and/or wavelength-dependent filtering by introducing the beam variation module in a beam path of the measurement radiation.

14. The surveying instrument as claimed in claim 1, wherein
  the structure comprises a targeting and target-tracking device with a position-sensitive detector, wherein measurement radiation reflected at a reflector unit can be acquired by the position-sensitive detector and an offset of the acquired measurement radiation relative to a reference point on the detector can be determined, wherein the targeting and target-tracking device is arranged in the imaging system.

15. The surveying instrument as claimed in claim 12, wherein
  the targeting and target-tracking device comprises a further beam source for emitting laser radiation, wherein laser radiation reflected at the reflector unit can be used as measurement radiation for determining the offset on the position-sensitive detector,
  wherein
    the measurement axis can be aligned in an automatically controlled manner depending on the offset in such a way that the measurement radiation is continuously aligned onto a center of the reflector unit.

16. The surveying instrument as claimed in claim 1, wherein
  the structure comprises a target search module with a transmission unit for emitting search radiation in the form of a light fan and a reception unit for detecting at least part of reflected search radiation.

17. The surveying instrument as claimed in claim 1, wherein the target point comprises a retroreflecting prism.

* * * * *